United States Patent [19]

Kashio

[11] 3,958,252

[45] May 18, 1976

[54] INK JET TYPE CHARACTER RECORDING APPARATUS

[75] Inventor: Toshio Kashio, Yamato, Japan

[73] Assignee: Casio Computer Co., Ltd., Tokyo, Japan

[22] Filed: July 29, 1974

[21] Appl. No.: 492,714

Related U.S. Application Data

[63] Continuation of Ser. No. 305,600, Nov. 10, 1972, abandoned.

[30] Foreign Application Priority Data

Nov. 12, 1971 Japan .............................. 46-89961

Nov. 12, 1971 Japan .............................. 46-89962

[52] U.S. Cl. .............................................. 346/75

[51] Int. Cl.$^2$ ........................................ G01D 15/18

[58] Field of Search ...................................... 346/75

[56] References Cited

UNITED STATES PATENTS

| | | | |
|---|---|---|---|
| 3,488,664 | 1/1970 | Winston | 346/75 |
| 3,588,906 | 6/1971 | Van Brimer | 346/75 X |
| 3,641,588 | 2/1972 | Metz | 346/75 |

*Primary Examiner*—Joseph W. Hartary

*Attorney, Agent, or Firm*—Flynn & Frishauf

[57] ABSTRACT

An ink jet character recording apparatus comprises a first deflection electrode for deflecting the stream of ink droplets ejected from a nozzle in a direction perpendicular to the direction of relative movement between a recording paper and the nozzle, a second deflection electrode for deflecting the stream of ink droplets in a direction substantially perpendicular to the direction of deflection effected by the first electrode, and an ink collector for collecting the ink droplets.

3 Claims, 6 Drawing Figures

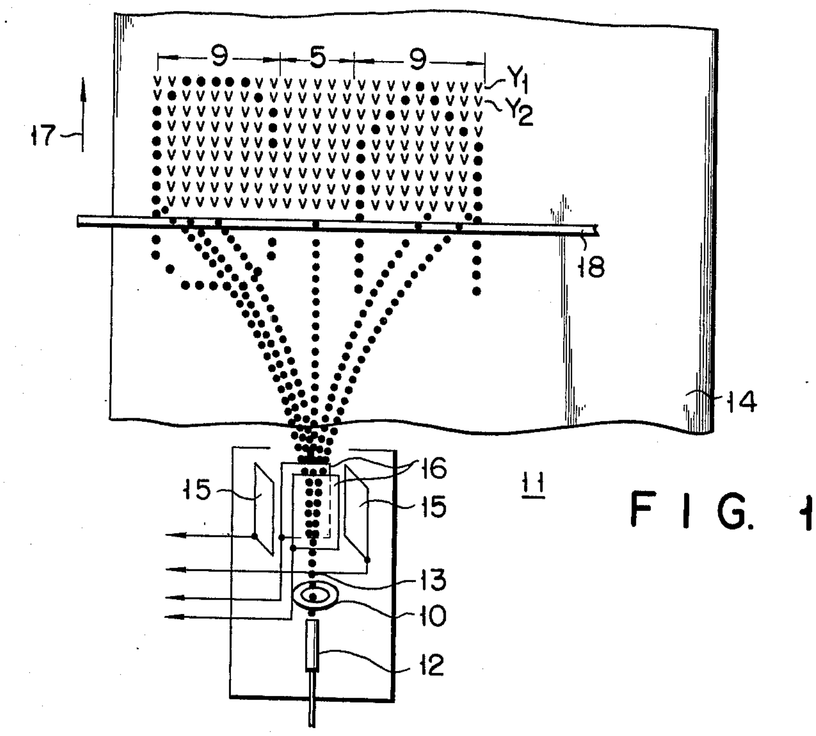
F I G. 1
F I G. 3
F I G. 2
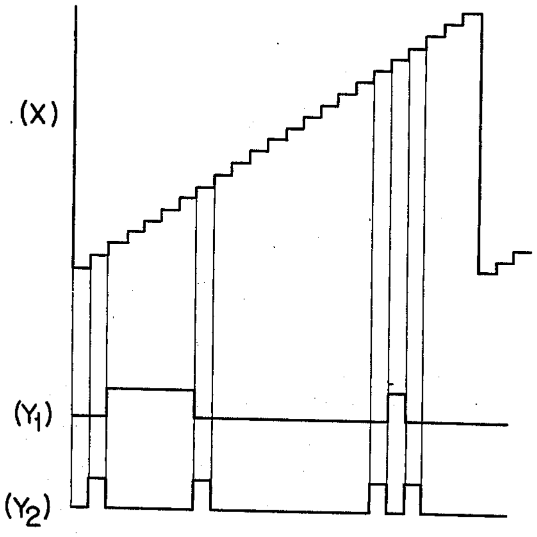
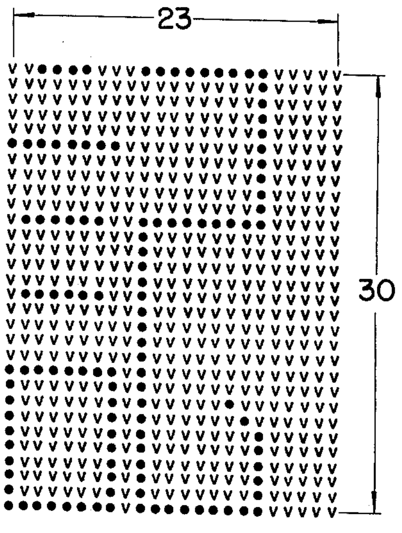

INK JET TYPE CHARACTER RECORDING APPARATUS

This is a continuation of application Ser. No. 305,600, filed Nov. 10, 1972 now abandoned.

BACKGROUND OF THE INVENTION

This invention relates to an ink jet type character recording apparatus wherein characters are recorded on a recording paper by charged droplets or minute particles of ink ejected from a nozzle, and more particularly to an ink jet type recording apparatus wherein the control of the fly of the ink jet is effectd by applying a deflecting force thereto in a direction perpendicular to the direction of fly by means of deflection electrode means during recording or nonrecording.

In a prior art ink jet type character recording apparatus, the deflection of the droplets of electrically charged ink is controlled by applying suitable deflection voltages corresponding to the position of a given ink dot of a character to be recorded upon the deflection electrodes of the X and Y axis deflection systems whereby a desired character, pattern or symbol is depicted on the recording paper by a group of dots.

Also other prior art ink jet type character recording apparatus have only an X-axis deflection electrode, and a recording paper only moves to Y-axis direction. Suppose now that a letter is depicted by selecting suitable positions of the dots among a group of 9 × 15 dots, that is 9 dots in the direction of the X-axis and 15 dots in the direction of the Y-axis, and that the nozzle for ejecting the ink droplets is positioned on the first line in the X-axis direction. Then, the deflection electrode of the X-axis deflection system is impressed with a deflection voltage which varies as 「000050000」 with time from dot to dot, whereas on the second line is applied a deflection voltage in the form of 「000406000」 in accordance with the respective dots. In this manner, by relative movement of the recording paper and nozzle, dots are recorded from line to line to form the letter A, for example, by a group of dots recorded on the recording paper. Considering the deflection voltage utilized to deflect the ejected ink droplets in the X-axis direction, assuming the second line mentioned above, at a point corresponding to the fourth dot, the deflection voltage is increased from zero to a value corresponding to 4, then reduced to zero and again increased to a value corresponding to 6 at a point corresponding to the sixth dot. Thus, the deflection voltage takes the form of a rectangular wave. Where a zero deflection voltage is impressed so that no dot is recorded on the recording paper, the ejected ink droplets are collected by an ink collector disposed on one side of the recording paper. Upon application of the recording voltage, the ejected ink droplets are shifted from the collector to a selected recording position. At this time, it is necessary to quickly vary the deflection voltage from zero to a value corresponding to 4 or 6, thereby requiring a large change in the amplitude of the deflection voltage and causing instability of the operation. Furthermore, due to the switching of the deflection voltage during the fly of the ink droplets or due to the presence of some time constant of the deflection voltage control circuit the ink droplets can not arrive at the desired dot position on the recording paper with the result that the dot is formed on an unwanted position thus making it difficult to depict the correct character. Further, according to the conventional apparatus, each time a character, pattern or symbol on a given line is depicted, the ink ejecting nozzle and the deflection means associated therewith are advanced step by step. According to another arrangement, a plurality of ink ejecting nozzles and deflecting means of number equal to that of the characters of one line are arranged in parallel, and a set of nozzles and deflecting means associated therewith are selected to depict a character. In this manner, all characters on one line are depicted sequentially.

However, when the apparatus is constructed such that characters on one line are depicted with a single nozzle, it is necessary to advance the nozzle one step after one character has been depicted for depicting the next character, thus requiring much time for recording. Where a plurality of nozzles and deflection means are provided for one line, it is necessary to provide a plurality of discrete deflection voltage control circuits for controlling the X and Y axis deflection voltages of respective deflection means for producing character signals, thus complicating the construction of the apparatus.

It is an object of this invention to provide new and improved ink jet type recording apparatus capable of deflecting the stream of ink droplets ejected from a nozzle toward and away from a recording paper so as to describe or not describe characters, patterns or symbols with a deflection voltage whose amplitude is varied in a small width, thereby making it possible to stably record characters, etc. with a minimum time.

Another object of this invention is to provide improved ink jet type character recording apparatus capable of simultaneously recording a plurality of unit characters in one line by means of a plurality of ink dots by providing a plurality of juxtaposed ink nozzles of the same number as that of the unit characters of one line and deflection means for deflecting the stream of ink droplets ejected from the nozzles toward and away from the recording paper.

SUMMARY OF THE INVENTION

According to this invention, these and other objects can be accomplished by providing an ink jet type character recording apparatus comprising nozzle means for ejecting a stream of ink droplets toward a recording paper; an ink collector disposed to extend in a direction substantially at right angles with respect to the direction of relative movement between the recording paper and the nozzle means for collecting the ejected ink droplets when recording with the ink droplet is not to be made on the recording paper; a first deflection electrode for deflecting the ink droplets by the deflection voltage in a direction perpendicular to the direction of said relative movement; and a second deflection electrode for deflecting the ink droplets in a direction substantially perpendicular to the direction of deflection effected by the first electrode, thereby collecting the ink droplets by the ink collector when the character is not recorded.

Further, according to the present invention there is provided a character storing register adapted to store the characters to be recorded on a recording paper, a character signal generator for reading out a group of characters of one line from the register and for forming unit character signals corresponding to the unit character included in the group of characters, a plurality of ink ejection nozzles which are disposed at a predetermined spacing in a direction substantially perpendicular to the direction of relative movement between the recording paper and the nozzles, the number of the nozzles being equal to the number of the unit characters, a plurality of pairs of groups of deflection electrodes disposed along the path of fly of the ink streams ejected by the plurality of nozzles, each pair of groups being associated with respective nozzles, one of the groups of each pair being disposed in parallel with the direction of relative movement between the recording paper and the nozzles and the other group of each pair being disposed on a line perpendicular to the direction of relative movement, a first deflection control circuit controlled by the output from the character signal generator for simultaneously applying deflection voltages for respective unit characters upon corresponding groups of deflection electrodes so as to deflect the ink streams in a direction perpendicular to the direction of relative movement between the recording paper and the nozzles, a control register which is connected to receive the output from the character signal generator in synchronism with the deflection voltages controlled by the first group of the deflection control circuit, for storing the deflection controls of the respective unit character signals in the direction of relative movement supplied by the character signal generator, the deflection controls being effected for respective nozzles for respective unit characters, and a second deflection control circuit for applying deflection voltage to the group of deflection electrodes which are disposed in parallel with the direction of relative movement between the recording paper and the nozzles corresponding to respective unit characters stored in the control register so as to control the streams of ink toward and away from the recording paper in accordance with the signals of a recording level and a non-recording level.

With this apparatus, it is possible to deflect the stream of ink droplets so as to record or not record on a recording paper with ink dots by means of a deflection voltage whose amplitude is varied by a small degree. It is also possible to record clearly characters, symbols or patterns at higher speed at correct positions than with the prior apparatus.

According to the embodiment utilizing a plurality of juxtaposed nozzles, as it is possible to simultaneously record a plurality of unit characters in one line with the plurality of nozzles, the time required for recording can be greatly reduced when compared with prior art apparatus wherein a plurality of characters are recorded one after the other. Further, it is possible to greatly simplify the construction of the apparatus because the deflection control of a plurality of streams of ink droplets is effected by a single control circuit.

BRIEF DESCRIPTION OF THE DRAWINGS

FIG. 1 is a diagrammatic representation of the ink jet type recording apparatus embodying the invention, more particularly the recording section thereof;

FIG. 2 shows signal waveforms helpful to explain the operation of the recording section;

FIG. 3 shows different examples of the characters recorded;

DESCRIPTION OF THE PREFERRED EMBODIMENTS

Figure 4:
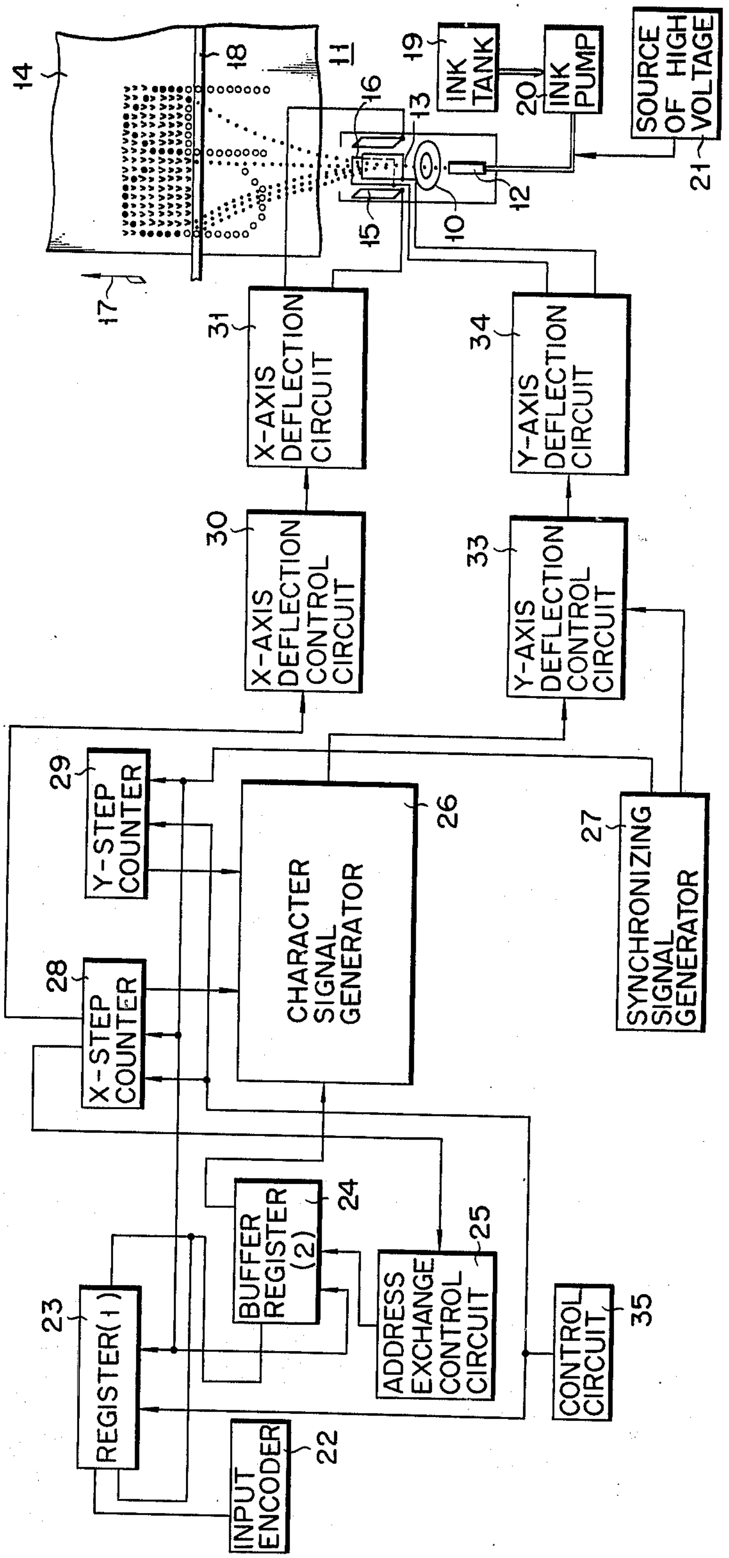
FIG. 4 is a block diagram of a control circuit for controlling the recording section shown in FIG. 1.

Referring now to FIG. 1 of the accompanying drawings, there is shown a single recording section 11 including a nozzle 12 through which droplets of ink 13 are ejected intermittently. The ink droplets 13 are accelerated by an accelerting plate member 13 to fly toward a recording paper 14 and are deflected by X-axis deflection electrodes, 15 and Y-axis deflection electrodes 16 which are disposed along the path of fly of the ink droplets 13. The recording paper 14 is advanced at a constant speed in the direction of arrow 17, and an ink collector 18 is disposed to extend in a direction perpendicular to the direction of movement of the recording paper 14 close to the surface thereof. The collector 18 functions to collect the ink droplets 13 which are not deposited upon the recording paper and may be formed of a metal rod since the particle size of the ink droplets is extremely small. The ink droplets are deflected in the direction of the X-axis by means of the X-axis deflection electrodes 15 and in the direction toward collector 18 and on the dot positions on the recording paper by the action of the Y-axis deflection electrodes 16. The recording of the characters on the recording paper 14 is controlled by the cooperation of the deflection electrodes 15 and 16. Thus, a steady saw tooth wave is utilized as the X-axis deflection voltage and a binary character signal is used as the Y-axis deflection voltage.

Where a signal character depicted by a single nozzle 12 comprises 23 dots arranged in the direction of X-axis and 15 dots arranged in the direction of Y-axis, as shown in FIG. 1, for example, the deflection voltage impressed upon the X-axis deflection electrodes takes the form of a saw tooth wave which increases stepwisely for respective dots as shown by curve (X) in FIG. 2. The ink droplets are deflected along the X-axis toward respective dot positions by the voltages at respective steps. On the other hand, across the Y-axis deflection electrodes 16, is impressed a binary signal voltage which varies between two voltage levels indicated by $Y_1$ and $Y_2$ in FIG. 2. The signal voltage is controlled to build up sharply at each position where a dot is to be recorded on the recording paper. Level $Y_1$ corresponds to the first line $Y_1$ in the direction of the X-axis of the character pattern shown in FIG. 1, whereas $Y_2$ to the second line $Y_2$, these levels being set in synchronism with the respective steps of the X-axis deflection voltage.

In the illustrated example, 23 dots which are arranged along the X-axis and are plotted by a single nozzle 12 are divided into three groups of 9, 5 and 9 dots. The center 5 dots are used as space dots so as to concurrently describe two characters "C" and "A" which are displayed as a unit character. It is also possible to describe larger characters or complicated characters such as Chinese characters by so modifying the character signal that each character pattern comprises 23 dots in the horizontal direction and 30 dots in the vertical direction, in other words, by increasing the number of horizontal scanning lines for one unit character.

The control circuit for driving recording section 11 is shown in FIG. 4. Ink is supplied to nozzle 12 from an ink tank 19 through an ink pump 20. A high voltage is applied to the ink from a source of high voltage 21 for ejecting the ink from nozzle 12 by an intense electrostatic field. The ink droplets electrically charged in this manner are accelerated by the accelerating electrode 10 toward recording paper 14.

The character to be recorded is applied to an input encoder 22 and then stored in a register 23. Where the unit of the character described by one nozzle consists of two characters, there is provided a buffer register 24 for storing these two characters. The buffer register 24 functions to read out two characters to be recorded for example "C" and "A" from register 23 and to store the read out characters in the buffer register 24. The characters stored in the buffer register 24 are selectively designated by the command signal from an address exchange control circuit 25 and a character code signal of the selected character is applied to a character signal generator 26. Associated with the character signal generator 26 are an X-step counter 28 and a Y-step counter 29 which are driven by the synchronizing signal generated by a synchronizing signal generator 27. The X-step counter 28 designates the dot steps in the X-axis direction and sends the information thereof to the character signal generator 26. At the same time, signals are sent to an X-axis deflection control circuit 30 comprising a digital-analogue converter or the like utilizing a ladder matrix circuit for controlling an X-axis deflection circuit 41 to produce an X-axis deflection voltage of the quasi-saw tooth wave form, as shown in FIG. 2 wherein the voltage varies stepwisely in synchronism with the designation of the dot steps. Further, the X-step counter 28 sends a command signal to the address exchange control circuit 25. More particularly, the X-step counter 28 detects a group of dots assigned for one character of the unit character pattern constituted by the dots as shown in FIG. 1 when the horizontal scanning operation of 9 dots is completed by counting the number of dots to produce an address exchange command signal for selectively designating one of the characters "C" and "A" which have been stored in the buffer register 24. The signal of the selected character is sent to the character signal generator 26. Where two characters "C" and "A" are to be described by one nozzle 12, at the beginning of the horizontal scanning, the character signal corresponding to character "C" is firstly sent to the character signal generator 26 and the character signal corresponding to character "A" is sent to the character signal generator 26 during the latter half of the horizontal scanning. The switching between character signals is repeated each time the scanning in the X-axis direction for one line has been completed.

The X-step counter operates to drive the Y-step counter 29 each time it completes the counting operation of one horizontal scanning. The Y-step counter 29 is also controlled by the synchronizing signal generated by the synchronizing signal generator 27 so as to count "1" each time the scanning operation in the X-axis direction for one line has been completed, thereby designating one of the lines $Y_1$, $Y_2$ . . . of the unit character pattern shown in FIG. 1 to send a command signal to the character signal generator 26. More particularly, "1" or "0" signals representing the presence or absence of the dots on a line designated by the Y-step counter of the character signal applied to the character signal generator 26 under the control of the command signal of the address exchange control circuit 25 are read out from the character signal generator 26 corresponding to a given step of the X-step counter 28 thereby producing a character signal as shown in FIG. 2. This character signal is sent to a Y-axis deflection control circuit 33 for causing it to supply a deflection signal to a Y-axis deflection circuit 34. A control circuit 35 is provided which functions to send a read out command signal to register 23 and a start command signal to the X and Y-step counters 28 and 29 each time the recording of a unit character is completed.

In operation, a character to be recorded is written in register 23 by the input encoder 22 and by the command signal from the control circuit 35. One unit character, in this example, consisting of two characters, is read out from register 23 and the read out unit character is stored in the buffer register 24. Where the two characters to be recorded comprise "C" and "A", for example, these characters are sequentially read out from the buffer register by the signal from the address exchange control circuit 25 and the read out characters are sent to the character signal generator 26. The read out switching command signal is provided by the X-step counter 28 whereby two characters "C" and "A" are sent to the character signal generator 26 in synchronism with the X-axis deflection operation at each horizontal scanning as above described thus sending to the Y-axis deflection circuit 34 a character signal of a given line designated by the Y-step counter 29. As above described, by deflecting the ink droplets 13 ejected from nozzle 12 either to the collector 18 or to the dots to be recorded on the recording paper 14, the dots that depict the characters "C" and "A" are deposited with the droplets, thereby simultaneously depicting the two letters "C" and "A" by the ink droplets ejected from a single nozzle 12 by scanning the stream of the ink droplets in the X or horizontal direction and by advancing the recording paper 14 in the direction of arrow 17. It should be understood that the number of dots constituting one unit character is not limited to the illustrated example, that is (9, 5, 9) × (15) or (23) × (30), and that many other numbers and arrangements of the dots may be used depending upon the dimensions of the characters, patterns and symbols to be recorded and the easiness of discrimination thereof.

In this example, the X-step counter designates the scanning of one line in accordance with its count 23, and discriminates the recording of one charactor, a space, and the recording of the other character, each time it counts 9, 5 and 9 sequentially for producing an address switching command signal for the address exchange control circuit 25. The Y-step counter 29 functions to judge that the recording of one unit character has been completed each time it counts 15.

Further, where each one unit character comprises only one character as shown in FIG. 3 it is not necessary to use the address switching control in which case it is only necessary to send one character to the character signal generator 26 from the register 23 each time the recording of one character has been completed. In this case, the Y-step counter 29 can determine the completion of the recording of one unit character whenever it counts 30.

In this embodiment, the stream of the ink is deflected in the X-axis direction by the X-axis deflection voltage of the saw tooth waveform which is repeated cyclically, and the character is described by the character signal which is switched between "1" and "0". Dependent upon the direction of the ink ejection nozzle in the X-axis direction, the waveform of the deflection voltage may be triangular. For this reason, the character signal can be greatly simplified, thus permitting the use of a binary signal instead of an analogue signal. This greatly simplifies the construction and stabilizes the operation of the character signal generating circuit. Further, as the stream of the ink droplets is selectively directed to the recording paper or to the collector, the control of the deflection of the ink stream with respect to the relative movement between the nozzle and the recording paper which is effected for the purpose of recording the character can be effected with a minimum deflection power, thereby increasing the stability of the ink deflection operation. According to this embodiment, any undesirable dot which is caused by an erroneous operation occuring when the ink droplets are conveyed to the recording paper appears only near the desired dot which has an effect of interconnecting dots or thickening a depicted line, thereby increasing the clearness of the depicted character, pattern or symbol. Such an error is caused by the fact that where it is not desired to form any dot, the stream of the ink droplet is deflected toward collector 18 and is rather effective to depict a clear and beautiful character, pattern and symbol.

Figure 5:
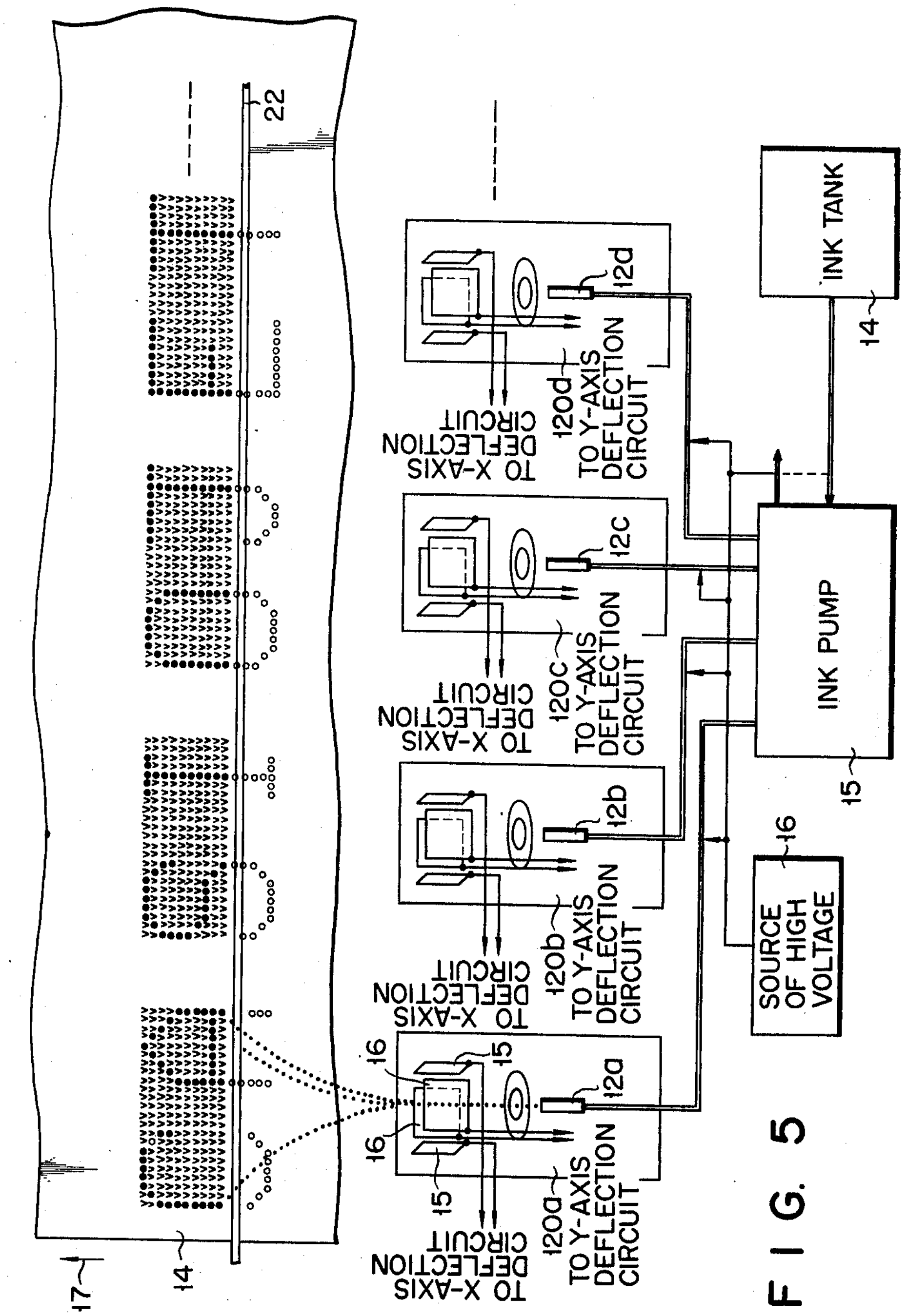
FIG. 5 is a diagrammatic representation, partly in block form, of a modified embodiment of this invention utilizing a plurality of juxtaposed nozzle means.
Figure 6:
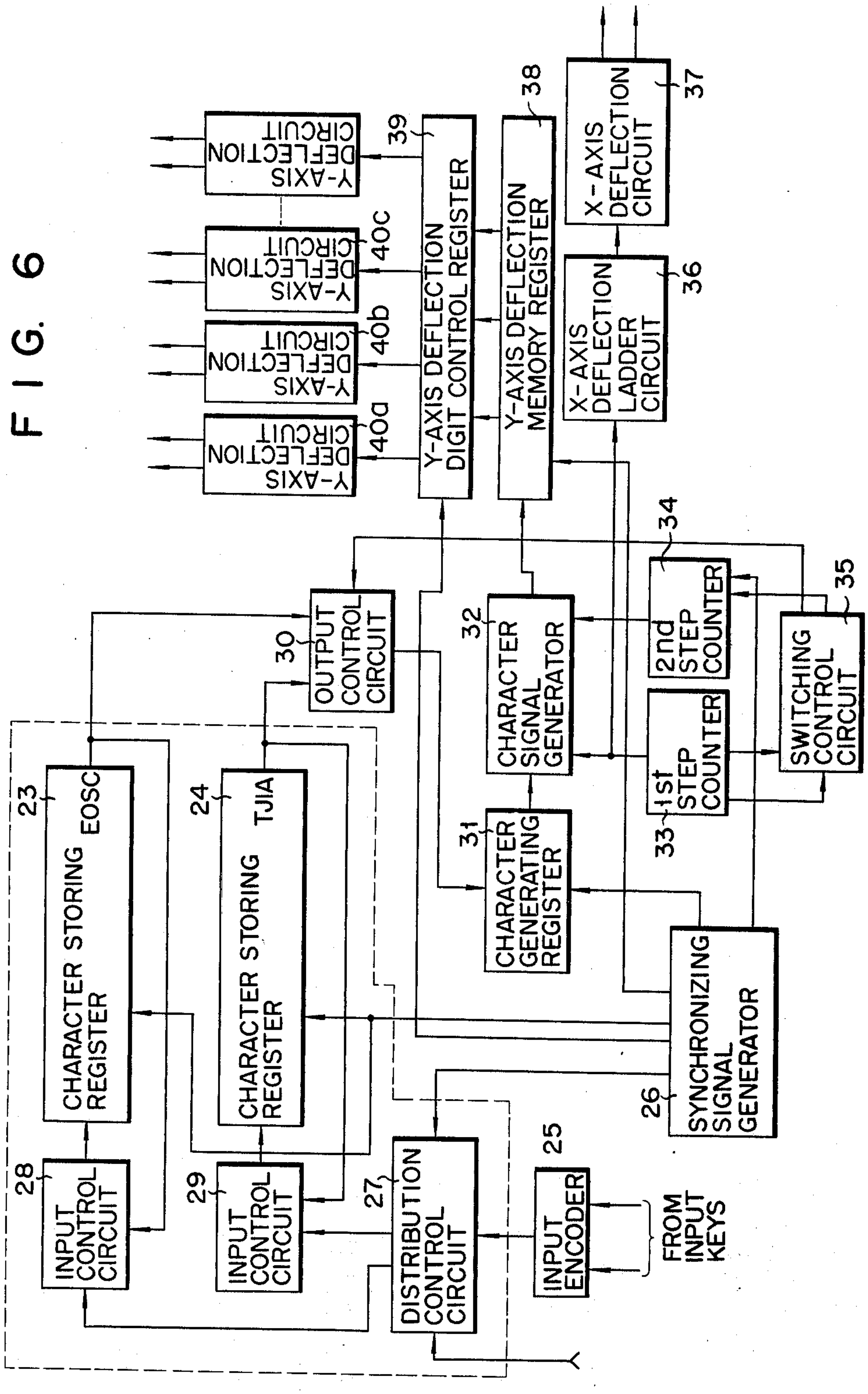
FIG. 6 shows a block diagram of a control circuit used to control the recording section shown in FIG. 5.

FIGS. 5 and 6 illustrate a modified embodiment of this invention wherein a plurality of nozzles are juxtaposed. FIG. 5 shows an arrangement of a plurality of recording heads 120*a*, 120*b* . . . , which are disposed in parallel in a direction perpendicular to the direction of movement of the recording paper 14 which is shown by arrow 17. The recording heads are controlled, independently, for respectively describing one unit character on the recording paper 14. Each unit character comprises characters of the number corresponding to the number of characters to be depicted on one line divided by the number of the recording heads. In this example, each head describes two characters at the same time and the two characters constitute one unit character. As can be readily understood, one unit character may comprise only one or three characters, but for the purpose of description, it is assumed herein that each unit character comprises two characters. Accordingly, where the number of the juxtaposed recording heads equals N, the number of characters included in one line is 2N. To the nozzles 12*a*, 12*b* . . . provided for respective recording heads 120*a*, 120*b* . . . , is supplied ink from ink tank 14 through an ink pump 15. Further, a high voltage is impressed upon the ink from the source of high voltage 16 to atomize the ink by the electrostatic field and to convey the atomized ink particles toward the recording paper.

In this example, an ink collector 22 is provided common to all recording heads 120*a*, 120*b* . . . , for normally collecting the ink droplets.

FIG. 6 shows a block diagram of a driving circuit for controlling the recording heads, each constructed to describe unit characters comprising two characters, respectively. In this example, the lefthand and righthand characters of each unit character are stored in the first and second character storing registers 23 and 24, respectively. More particularly, the character signal of one line produced by an input encoder 25 in response to the operation of character keys, not shown, or produced by an external source, such as a magnetic tape, not shown, are supplied to a distribution control circuit 27 which is driven by the synchronizing signal from a synchronizing signal generator 26, the control circuit 27 alternately distributing the lefthand character signal and the righthand character signal to the input control circuits 28 and 29. The character signals from these control circuits are written in character storing registers 23 and 24, respectively. Assuming, for example, input characters of "CASIOJET", the characters "CSOE" are stored in the first character storing register 23 whereas characters "AIJT" in the second character storing register 24.

The output signals from the character storing register 23 and 24 are selectively read out through an output control circuit 30 and supplied to a character generating register 31. Thus this register stores characters "CSOE" or "AIJT" supplied from the control circuit 30 and the contents of the register 31 are supplied to a character signal generator 32, for producing character signals under the command signals from the first and second step counters 33 and 34 which are driven by the synchronizing signal generated by the synchronizing signal generator 26. The first step counter 33 is used to designate the dot position in the horizontal scanning and detect the completion of one horizontal scanning when it counts 23 where the number of dots in the horizontal direction for one unit character equals 23. When the counter 33 counts 9 it detects the completion of the horizontal scanning for one character on the lefthand side. The signals detected by the counter 33 are applied to a switching control circuit 35 for providing a selection switching signal to an output control circuit 30. Similarly, the second step counter 34 is also driven by the switching control circuit 35 to count the number of signals each time one horizontal scanning has been completed, thereby designating the position of the dots in the Y-axis direction of the character pattern. The signal representing the number of counts of the first step counter 33 is applied to an X-axis deflection ladder circuit 36 for causing an X-axis deflection circuit 37 to generate the X-axis deflection voltage shown in FIG. 2. The X-axis deflection voltage is supplied in parallel to respective X-axis deflection electrodes 15 associated with respective recording heads 120*a*, 120*b* . . . , shown in FIG. 5.

The character signal generator 32 functions to generate a character signal corresponding to the character received from the character generating register 31. Thus, the character signal generator 32 generates a signal for each dot of the character pattern consisting of 23 horizontal dots and 15 vertical dots. The particular dot corresponding to this signal is designated by the first and second step counters 33 and 34. For example, under the initial conditions of the step counters 33 and 34 wherein their counts are zero, the character generator 32 generates a signal which designates the first column $X_1$ at the leftmost side of the first line $Y_1$ of the character pattern thereby generating a binary signal for each unit character, which indicates the recording or not recording of the designated dot. The successive binary signals are temporarily stored in a Y-axis deflection memory register 38. In response to the next synchronizing signal, the signals stored in the memory register 38 are transferred to a Y-axis deflection digit control register 39 to drive Y-axis deflection circuits 40*a*, 40*b* . . . of respective recording heads 120*a*, 120*b* . . . thereby supplying a deflection voltage comprising a binary signal including a "1" or a "0". Under these conditions, since the step counter 23 advances one step, the character generator 32 generates a signal which designates the second column $X_2$ in the first line $Y_1$ and this designating signal is stored in the Y-axis deflection memory register 38.

In this manner, the characters stored in the first and the second character storing registers 23 and 24 are read out in accordance with the position of the horizontal scanning which is determined by the count of the first step counter 33 and the read out characters are stored in the character generating register 31. Considering the operation of the recording head 120*a* corresponding to the first unit character, at the initial side of the first step counter 33, the character "C" in the first character storing register 23 has been shifted to the character generating register 31 thus setting the character signal generator 32 at a condition capable of generating a character signal corresponding to character "C". Each time the first step counter 33 counts a predetermined number of signals the dot pattern signal of the first horizontal line of character "C" is read out and this signal is temporarily stored in the Y-axis deflection memory register 38 and then transferred to the first digit of the Y-axis deflection digit control register 39 thereby driving the Y-axis deflection circuits 40*a*. When the count of the first step counter 33 is increased to 9, the counter 33 produces a signal that drives the output circuit 30 to substitute the content of the character generating register 31 with the content "A" in the second character storing register 24. In this manner when the first step counter 33 further counts 5 which corresponds to a space the character signal generator 32 generates a signal corresponding to letter "A". When the first step counter 33 counts 23 corresponding to one horizontal scanning, the Y-axis deflection corresponding to one horizontal scanning is completed, thus depicting the dots on the first line shown in FIG. 1. In other words, as the counting operation of the first step counter 33 proceeds, the X-axis deflection voltage shown by X in FIG. 2 is generated thereby producing a Y-axis deflection voltage shown by $Y_1$. Similar operations are made concurrently for the other recording heads 120*b* . . . corresponding to respective unit characters. More particularly, the character generating register 31 has been selectively stored with the content of either the first or second character storing registers 23 or 24 and the signals successively generated by the character signal generator 32 corresponding to respective characters are stored temporarily in the Y-axis deflection memory register 38. When all signals have been stored in this memory register, they are simultaneously shifted to the Y-axis deflection digit control register 39, thereby simultaneously driving the Y-axis deflection circuits 40*b*. At the same time, the same deflection voltage is applied to the X-axis deflection electrodes of remaining deflection circuits 120*b* . . . from the X-axis deflection circuit 37. When the one horizontal scanning is completed in this manner, the second step counter 34 is advanced, whereas the first step counter 33 is returned to the initial state with the result that the signals of the second horizontal line are generated by the character signal generator 32. Under these conditions, the output control circuit 30 is also switched and the content of the character generating register 31 is substituted by the content of the first character storing register 23. Concurrently therewith, the recording paper 11 is advanced to record the second line. When the second step counter 34 counts 15, characters of the second line are recorded.

Although in the foregoing embodiment each unit character was comprised by two characters and the character storing registers 23 and 24 were constructed to store alternate characters included in one line to be recorded, such function can readily be accomplished by a single register in which case it is merely necessary to alter the read out control. As above described, each unit character may comprise one or three characters. In the former case, only one character storing register is sufficient so that it is not necessary to use a switching control circuit for switching the output of two character storing registers as in the illustrated example. Of course, in the latter case, it is necessary to use three character storing registers.

Further, it should be understood that the number of dots utilized to describe one character, digit or symbol, or the number of dots utilized to describe one unit character is not limited to those described above, that is 23 × 15 or 23 × 30 and that any number of dots can be used dependent upon the size of the character to be recorded on the recording paper.

The recording paper is advanced as the stream of the ink droplets is deflected in the horizontal direction. But such deflection is not required to be always horizontal but may be inclined slightly as long as such inclination does not affect the quality of the recorded characters. If the respective recording heads including deflection systems are inclined slightly, it is possible to assume horizontal scanning. This can also be accomplished by slight adjustment of the Y-axis deflection signals.

As above described, this invention provides a novel ink jet type character recording apparatus which can record simultaneously all characters of one line by a simple deflection control provided by extremely simple character signals. Especially, it is possible to constitute the control system for the character to be recorded with simple circuit elements such as registers. For this reason it is possible to combine the novel recording apparatus with various output devices to increase their output speeds.

In the case of a pattern, the pattern is divided into a plurality of sections, each of a size corresponding to that of one unit character, and a pattern signal is generated for each section so as to generate a signal corresponding to the pattern signal by the character signal generator, thereby enabling any pattern to be depicted on the recording paper. In this case it is advantageous to continuously form the dots of respective unit characters.

What is claimed is:

1. An ink jet type character recording apparatus comprising:

a character storing register for storing character information to be recorded on a recording paper which is adapted to be movable;

a character signal generator coupled to said character storing register for reading out a group of characters of a line which define a unit character matrix from said character storing register and for generating successively character signals corresponding to points on lines of each unit character matrix for arranging ink droplets on line rasters to form unit characters included in said group of characters;

a plurality of ink ejection nozzles each for recording said unit characters, said nozzles being arranged at predetermined intervals in a direction substantially perpendicular to the direction of relative movement between said recording paper and said nozzles;

a pair of X-axis deflection electrodes associated with each of said nozzles and disposed along the path of the ink streams ejected from each nozzle and perpendicular to said direction of relative movement between said recording paper and said nozzles;

a pair of Y-axis deflection electrodes associated with each of said nozzles and disposed along the path of the ink stream ejected from each nozzle and parallel to said direction of relative movement between said recording paper and said nozzles;

an X-axis deflection control circuit for supplying a signal with a value changing stepwise simultaneously to said X-axis deflection electrodes so as to deflect said ink streams from said nozzles in a direction perpendicular to the direction of the relative movement between said recording paper and said nozzles, thereby arranging ink droplets on line rasters;

a Y-axis deflection information memory means for receiving and temporarily storing binary information from said character signal generator, said binary information consisting of one-bit signals each of which correspond to a certain point on said line of each unit character matrix corresponding to a specific nozzle, said Y-axis deflection information memory means including means for receiving from said character signal generator next binary information consisting of one-bit signals each of which corresponds to a point next to said certain point on said line of each unit character matrix, while said binary information is read out to the pairs of Y-axis deflection electrodes, so as to deflect the ink streams from said nozzles in either one of "print" and "non-print" directions with respect to said recording paper in synchronism with the step of the applied application of deflection voltage controlled by said X-axis deflection control circuit;

a Y-axis deflection digit control register coupled to said Y-axis deflection information memory means for storing in parallel said binary information consisting of one-bit signals each corresponding to one point on said line of each unit character matrix corresponding to a specific nozzle, said binary information being stored in said Y-axis deflection information memory means; and a Y-axis deflection control circuit for simultaneously applying to said Y-axis deflection electrodes deflection voltages of recording or non-recording level in response to said binary information representing each unit character signal stored in said Y-axis deflection digit control register, to thereby control said ink streams from said nozzles toward and away from said recording paper.

2. Apparatus according to claim 1 wherein said group of characters comprises at least two unit characters.

3. Apparatus according to claim 1 including a counter means coupled to said character signal generator for controlling the reading out of said character signals from said character signal generator; and means coupling said character storage register to said character signal generator for feeding binary information from said character storage register to said character signal generator each time a nozzle is to eject ink to print a portion of a respective unit character.

* * * * *